US005375463A

United States Patent [19]

Nickel et al.

[11] Patent Number: 5,375,463

[45] Date of Patent: Dec. 27, 1994

[54] ARRANGEMENT FOR ASSISTING AN OPERATOR TO ADJUST A CARBURETOR

[75] Inventors: Hans Nickel, Cottenweiler; Thomas Schuster, Waiblingen-Hohnacker, both of Germany

[73] Assignee: Andreas Stihl, Waiblingen, Germany

[21] Appl. No.: 946,948

[22] Filed: Sep. 17, 1992

[30] Foreign Application Priority Data

Sep. 17, 1991 [DE] Germany ........................ 4130855

[51] Int. Cl.$^5$ .................... G01M 15/00; G01M 19/00

[52] U.S. Cl. ........................................ 73/118.1

[58] Field of Search ............... 73/117.2, 117.3, 118.1, 73/116; 340/691

[56] References Cited

U.S. PATENT DOCUMENTS 4,338,596 7/1982 Huber et al. .................... 340/691
4,719,794 1/1988 Ruiz ............................. 73/118.1
4,974,444 12/1990 Neubacher ..................... 73/118.1
4,979,477 12/1990 Nickel et al. .................. 123/335
5,040,117 8/1991 Shyu et al. ..................... 73/117.2
5,124,919 6/1992 Kastelle ........................ 73/118.1

*Primary Examiner*—Hezron E. Williams
*Assistant Examiner*—George M. Dombroske
*Attorney, Agent, or Firm*—Walter Ottesen

[57] ABSTRACT

The invention is directed to an arrangement for assisting an operator to adjust a carburetor. The arrangement has a display for the setting of the carburetor of an internal combustion engine such as a two-stroke engine. An actual signal proportional to the carburetor setting is compared to desired limit values by means of a comparator and the display is switched in dependence upon the comparison result by a control unit into different operating states. The display assumes a first operating state below a minimum desired limit value and, between the minimum and maximum desired values, the display is switched into a second operating state. The arrangement for carburetor adjustment makes it possible for the operator to recognize whether the actual signal is above or below the window determined by the desired limit values. This is achieved in that, above the maximum desired limit value, the display is switched into a third operating state, for example, by driving the display intermittently.

9 Claims, 3 Drawing Sheets

ARRANGEMENT FOR ASSISTING AN OPERATOR TO ADJUST A CARBURETOR

FIELD OF THE INVENTION

The invention relates to an arrangement for assisting an operator to adjust a carburetor. The arrangement has an optical and/or acoustical display for the setting of the carburetor of an internal combustion engine such as a two-stroke engine or the like.

BACKGROUND OF THE INVENTION

U.S. Pat. No. 4,979,477 is incorporated herein by reference and discloses how the carburetor setting can be made recognizable for an operator by an optical display such as a luminescent diode or the like. The luminescent diode is switched on or off by a control unit in dependence upon the comparison of an actual signal to a desired limit value. In a first operating state, the luminescent diode is switched off and thereby shows that the actual signal lies outside of the window determined by the desired limit values, that is, that the carburetor setting is poor. In its second operating state, the luminescent diode is switched on and shows thereby that the actual signal lies within the window determined by the limit values, that is, the carburetor is optimally adjusted.

If the optical display (luminescent diode) is switched off, the operator recognizes that the carburetor setting is incorrect but does not know whether the carburetor adjusting screw (for example, the idle adjusting screw) should be rotated in or rotated out. Accordingly, it can happen that the operator leans the idle mixture because of an incorrect rotation of the adjusting screw so much that an ignitable mixture is no longer present and the engine dies.

SUMMARY OF THE INVENTION

It is an object of the invention to provide an arrangement for assisting an operator to adjust a carburetor which is so improved that the operator can recognize on the basis of an optical display whether the carburetor adjusting screw must be rotated in or out.

The arrangement of the invention is for assisting an operator to adjust a carburetor of an internal combustion engine such as a two-stroke engine. The arrangement includes: means for generating an actual signal proportional to the carburetor setting; display means switchable into three operating states which are displayed as an aid to the operator for setting the carburetor; and, a control unit for receiving the actual signal and including comparator means for comparing the actual signal to minimum and maximum desired limit values and providing first, second and third results indicative of whether the actual signal is less than the minimum desired limit value, between the desired limit values and greater than the maximum desired limit value, respectively; and, drive means for switching the display means into one of the operating states in dependence upon which one of the results is produced by the comparator means.

By providing a third operating state, which can be reliably distinguished from the other two operating states, the operator can recognize whether the setting is above or below the setting window and from this, the operator can conclude whether the carburetor adjusting screw must be rotated in or out.

In addition to the operating states "on" and "off", a further operating state is provided as an intermittent switch-on and switch-off of the optical or acoustical display.

According to another feature of the invention, and after the second operating state is reached, the desired limit values determining a window are changed by a hysteresis value in order to obtain a wider window. Accordingly, a very narrow adjustment window can be first selected which facilitates an optimal carburetor adjustment. The enlargement of the window after reaching the optimal carburetor setting is provided in order not to immediately display an incorrect setting of the carburetor for engine speed fluctuations occurring because of ignition misfires or the like. An incorrect carburetor setting which must be adjusted is present only when the window, which is widened by adding the hysteresis values to the desired limit values, is left.

The change of the desired limit values after reaching the second operating state advantageously takes place after a pregiven time interval has passed, especially after a pregiven number of revolutions of the internal combustion engine.

In another preferred embodiment, either a mean value formed over the number of the last sequential ignition time points or an engine speed deviation added over a pregiven number of revolutions is used as an actual signal with the discrete rpm-deviation being determined for each revolution. These signals usable alternatively as an actual signal ensure an optimal setting of the carburetor even when (as with a two-stroke engine) rpm-fluctuations occur during one revolution up to 1,000 rpm/min. If the rpm-signal is used directly as the actual signal, then the window selected must be relatively wide to consider the possible short-term intense rpm-fluctuations and this would hardly allow an optimal carburetor setting.

If the window would nonetheless be selected as being relatively small, then a very frequent switchover of the operating states of the optical display would take place because of the intense rpm-fluctuations so that the individual operating state could be detected by the operator only with difficulty. If the actual signal is derived from a mean value formed over the number of last sequential time points or is the actual signal formed as an integral signal of rpm-deviations summed over a pregiven number of revolutions, then such intense fluctuations do not occur in the actual signal even for short-term intense rpm-fluctuations so that the selection of a narrow window for obtaining an optimal carburetor adjustment is possible.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
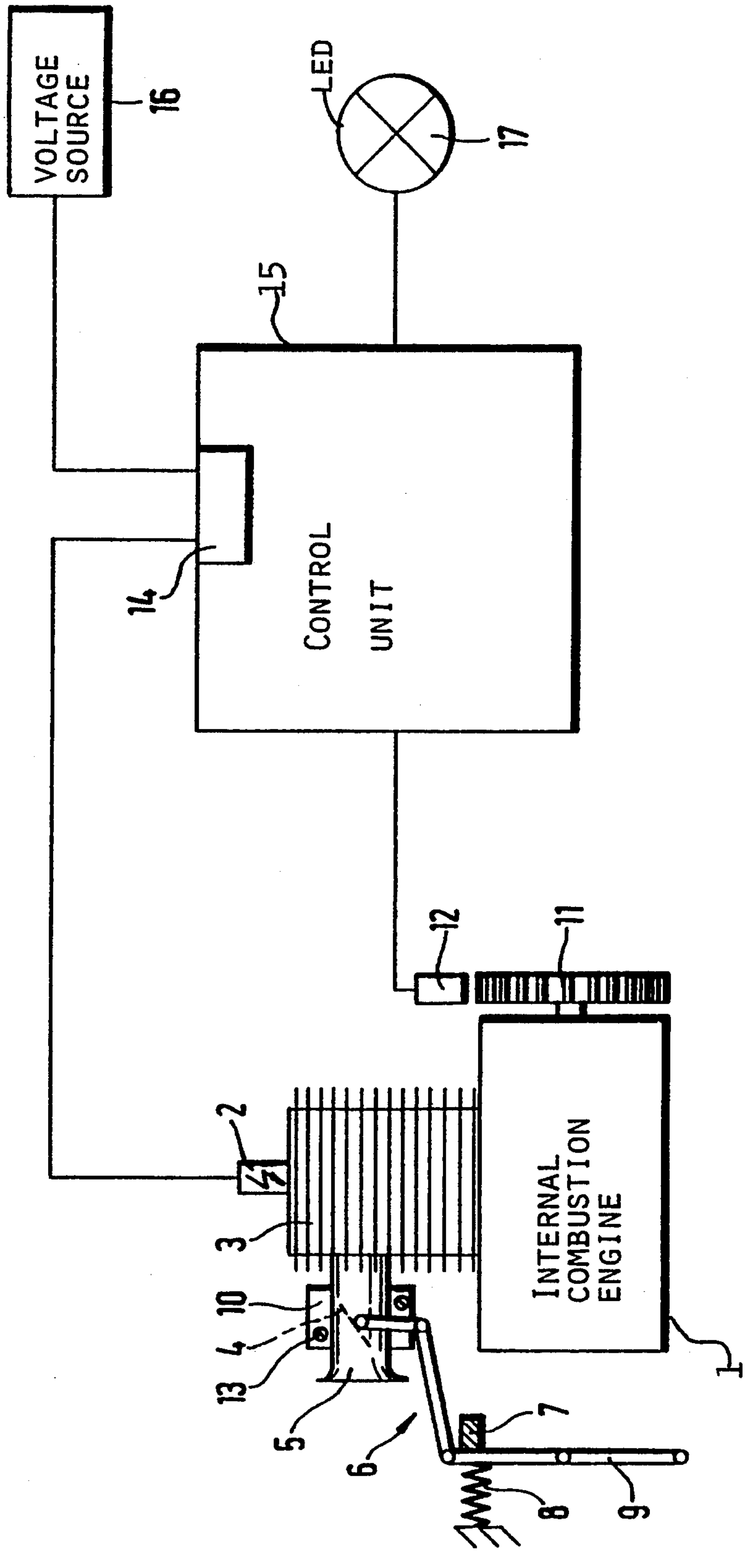
FIG. 1 is a schematic representation of a two-stroke engine having an ignition controlled by a microprocessor as the control unit.

In FIG. 1, a two-stroke engine 1 is shown as the internal combustion engine and has all ignition which is controlled by a control unit 15 defined by a microprocessor. The internal combustion engine can also be another air-cooled or water-cooled engine.

The cylinder 3 has an intake pipe 5 with a carburetor 10 and a throttle flap 4 which is actuable via a linkage 6 from a throttle lever 9 in order to change the engine speed. In the idle setting shown, the throttle lever 9 rests against a stop 7 under the action of a spring 8.

A pulse generator wheel 11 rotates with the crankshaft of the engine 1 and has marks provided at its periphery which generate pulses in a sensor 12. These pulses are supplied to the control unit 15 as an rpm-data signal. The marks at the pulse generator wheel 11 are arranged in such a manner that a signal is generated in the sensor 12 specific to the crankshaft position at least for each crankshaft rotation. From this signal, the control unit 15 can recognize the actual position of the crankshaft. Preferably, the marks are arranged over the periphery of the pulse generator wheel 11 at different spacings so that the angle position of the crankshaft can be determined from the spacing of the pulses of the sensor 12.

The microprocessor 15 controls a switch 14 in dependence upon the signals of the sensor 12. The switch 14 connects a spark plug 2 mounted on the cylinder 3 of the engine 1 to a voltage source 16 for generating an ignition spark emitted in the combustion chamber.

For an optimal operation of the two-stroke engine, an appropriate setting of the carburetor 10 is necessary which, for example, is made via an idle adjusting screw 13. The optimal setting of the carburetor 10 can be recognized from a constant idle engine speed of specific magnitude which can be made recognizable for the operator by driving an optical and/or acoustical display which in the embodiment is a luminescent diode 17.

Figure 2:
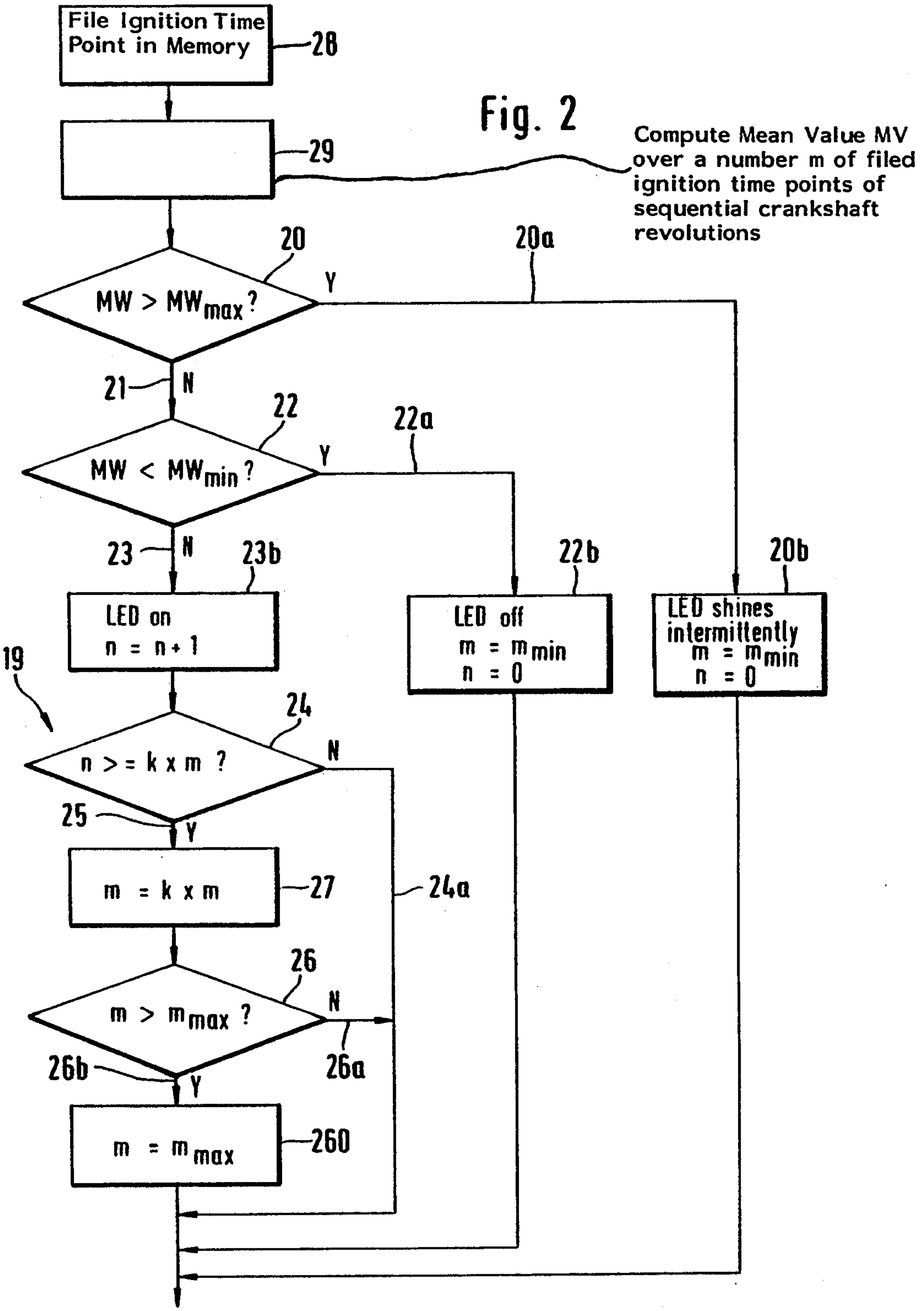
FIG. 2 is a flowchart for controlling the arrangement of the invention in dependence upon a mean value of sequential ignition time points; and, FIG. 3 is a flowchart for controlling the arrangement of the invention in dependence upon a totalized engine speed deviation.

According to an embodiment of the invention, a test is made in the control unit 15 in accordance with the flowchart of FIG. 2. With each crankshaft rotation, the microprocessor sets an ignition time point corresponding to the desired engine speed as described in U.S. Pat. No. 4,979,477 incorporated herein by reference. The ignition time point set for each crankshaft rotation is filed in a memory (function block 28) and the mean value MW is computed over a number (m) of the filed ignition time points of sequential crankshaft rotations. The mean value MW of the last ignition time points computed in this way is compared to a maximum desired limit value $MW_{max}$ according to the decision block 20. If the mean value MW is less than the desired limit value $MW_{max}$, then the program moves via the path 21 to a second decision block 22 wherein the mean value MW is compared to a minimum desired limit value $MW_{min}$. If the mean value MW is less than the desired limit value $MW_{min}$, then via path 22*a* and a control member 22*b*, the luminescent diode 17 is switched by microprocessor 15 into a first operating state in which the luminescent diode 17 is switched off. The switched off luminescent diode shows the operator that the mean value of the ignition time point of the last (m) rotations of the crankshaft was too low and that the operator must rotate the idle adjusting screw 13 in the appropriate direction.

The mixture composition, and therefore also the ignition performance, changes because of the rotation of the adjusting screw 13. The microprocessor 15 will attempt to reach the idle engine speed by appropriate control of the ignition time point. The mean value MW of the ignition time points of the last (m) rotations of the crankshaft will therefore increase. As soon as the mean value MW is greater than the minimum desired limit value $MW_{min}$ but yet less than the maximum desired limit value $MW_{max}$, the path 23 from the decision block 22 is taken with the microprocessor 15 permanently switching on the luminescent diode 17 via the control member 23*b*. The second operating state of the luminescent diode 17 is now present.

If the idle adjusting screw 13 is displaced to such an extent that the mean value MW is above the maximum desired limit value $MW_{max}$, then the decision block 20 is left via path 20*a* with the microprocessor 15 controlling the luminescent diode 17 to blink via the control member 20*b*. The operator now knows that the mean value MW lies above its window and that the idle adjusting screw 13 must be correspondingly rotated back.

With the possible three operating states of the luminescent diode 17, the operator is not only provided with information during adjustment of the carburetor that a carburetor setting is incorrect or correct, but from the different operating states, which are clearly distinguishable, above and below the setting window, the operator can draw the conclusion as to the required direction of rotation of the idle adjusting screw 13.

If the mean value MW lies precisely within the window determined by the desired limit values $MW_{min}$ and $MW_{max}$, then the branch 19 of the flowchart is run through with each crankshaft rotation so long as the mean value MW continues to lie within the window. With each run-through of branch 19, a flag (n) is increased by "1" and a check is made in a decision block 24 as to whether the flag (n) is greater than or equal to the pregiven number (m) of the sequential ignition time points, which were applied to form the mean value, multiplied by a progression factor (k) . The progression factor (k) is a positive whole number.

As long as the flag value is less than or equal to (k)·(m), the decision block 24 is left via the path 24*a* and, with the next crankshaft rotation, the branch 19 of the flowchart is again run through. If the flag value (n) is greater than (k)·(m) because of a multiple run-through of the branch 19 then the decision block 24 is left via path 25. In the following function block 27, the number (m) of the sequential ignition time points, which were applied for forming the mean value, are increased to (k)·(m). A check is then made as to whether the newly set number (m) is greater than a maximum value ($m_{max}$). If this is not the case, the decision block 26 is left via the path 26*a* and the branch 19 is again run through with the next crankshaft rotation. After a corresponding number of revolutions of the engine, a renewed stepwise increase of the number (m) by the factor (k) takes place in the same manner until the decision block 26 is left via path 26*b* and the number (m) is set to the maximum value ($m_{max}$) in the following function block 260.

This stepwise increase of the number of ignition time points processed for determining the mean value effects an equalization of possibly occurring fluctuations in the idle engine speed and of the shift of the ignition time point connected therewith. After reaching a relatively narrow window for the optimal carburetor adjustment, the derived actual signal is attenuated so that intense engine speed fluctuations which occur for a short time cannot immediately lead to a display of an incorrect carburetor setting. These intense engine speed fluctuations can arise, for example, from ignition irregularities.

If the ignition time point shift changes greatly because of intense engine speed fluctuations so that the formed mean value is no longer within the window, then the luminescent diode 17 is switched into the operating state "off" or into the operating state "blinking" via the decision blocks 20 or 22 in order to show the operator in which direction the idle adjusting screw 13 must be rotated for readjusting the carburetor 10. By driving one of the control members (20*b*, 22*b*), the flag (n) is set to "zero" at the same time and the number (m) is set to a minimum value ($m_{min}$) in order to make possible a precise carburetor adjustment.

Figure 3:
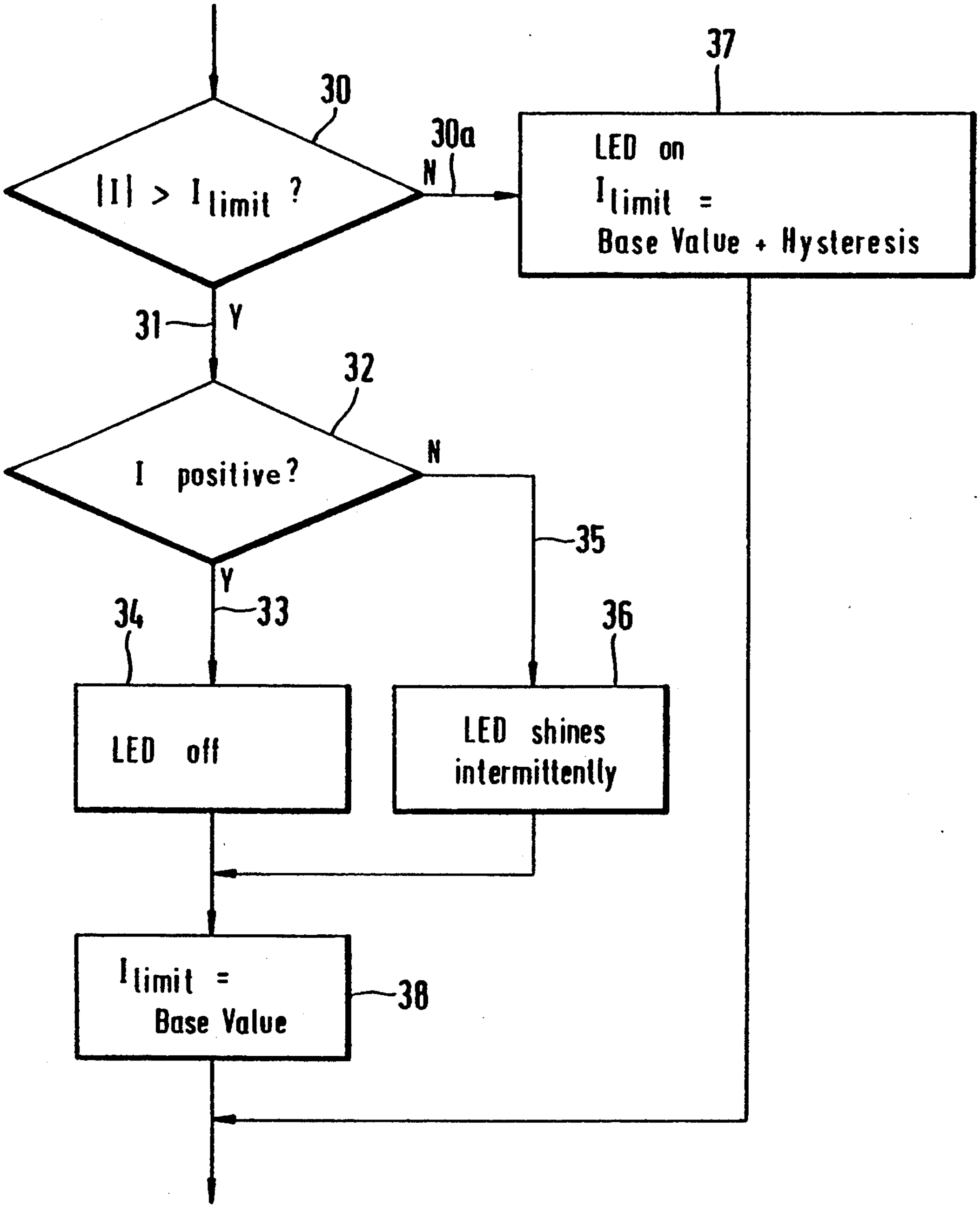

In the flowchart of FIG. 3, an integral signal is utilized as the actual signal which is formed in the manner described below. For each rotation of the crankshaft, the discrete engine speed deviation to the desired rotational speed (for example idle engine speed) is determined and the discrete engine speed deviations of sequential crankshaft rotations determined in this manner are summed. The summation of the engine speed deviations I defines an integral signal which is applied as the actual signal for the carburetor setting.

The magnitude of the discrete engine speed deviations summed in accordance with sign are compared to a desired limit value $I_{limit}$ in the decision block 30. If the summed engine speed deviation is less than the desired limit value $I_{limit}$, then the luminescent diode 17 is switched on by the control unit 15 via the path 30*a* and the control member 37. The user correctly recognizes the optimal setting of the carburetor 10.

If the magnitude of the summed engine speed deviation I is greater than $I_{limit}$, then the decision block 30 is left via path 31 and the program moves to decision block 32 in which the inquiry is made as to whether the summed engine speed deviation I is positive. If this is the case, then the decision block 32 is left via path 33 and the luminescent diode 17 is switched into the operating state "off" by the microprocessor 15 via the control member 34. The setting is too low.

On the other hand, if the decision block 32 is left via path 35, then the summed engine speed deviation is therefore negative and the control member 36 is driven so that the luminescent diode 17 is switched into the operating state "blinking" via the microprocessor 15. The setting is too high.

In the embodiment of FIG. 3, the desired limit value $I_{limit}$ forming the window is composed of a base value and a hysteresis value. If an incorrect carburetor setting is present, then after the control member 34 or 36 is driven, the desired limit value $I_{limit}$ is set to the base value in a following function block 38 thereby defining a narrow window. If the setting of this narrow window is reached, the decision block 30 is left via the path 30*a* and a hysteresis value is added to the base value of the desired limit value $I_{limit}$ whereby the window becomes wider. This has the consequence that after reaching the narrow window ($I_{limit}$=base value), occurring fluctuations of the added engine speed deviation I can be greater than the narrow window without a carburetor incorrect setting being displayed immediately. In this way, engine speed fluctuations which occur because of ignition irregularities can be blanked out. If the fluctuations of the amount of the summed engine speed signal I however become greater than the limit values ($I_{limit}$=base value+hysteresis value), which define the wider window, then the decision block 30 is left via path 31 and the incorrect setting is displayed and a switchback takes place to the narrower setting window ($I_{limit}$=base value).

It is understood that the foregoing description is that of the preferred embodiments of the invention and that various changes and modifications may be made thereto without departing from the spirit and scope of the invention as defined in the appended claims.

What is claimed is:

1. An arrangement for assisting an operator to adjust a carburetor of an internal combustion engine such as a two-stroke engine, the arrangement comprising:

means for generating a current carburetor setting signal proportional to the carburetor setting;

display means switchable into first, second and third operating states which are displayed as an aid to the operator for setting the carburetor;

said display means including only one luminescent diode and said first operating state being characterized by said luminescent diode being off, said second operating state being characterized by said luminescent diode being on and said third operating state being characterized by said luminescent diode blinking;

a control unit for receiving said current carburetor setting signal and including comparator means for comparing said current carburetor setting signal to minimum and maximum desired limit values and providing first, second and third results indicative of whether said current carburetor setting signal is less than said minimum desired limit value, between said desired limit values and greater than said maximum desired limit value, respectively;

said minimum and maximum desired limit values conjointly defining a window and said limit values being changed according to a hysteresis value for obtaining a wider window after said second operating state is reached;

said limit values being changed after said second operating state is reached and a pregiven time duration has elapsed; and, drive means for switching said display means into one of said operating states in dependence upon which one of said results is produced by said comparator means.

2. The arrangement of claim 1, wherein said first operating state is characterized by said display means being switched off; said second operating state is characterized by said display means being switched on, and said third operating state is characterized by said display means being intermittently switched on and off.

3. The arrangement of claim 1, wherein said pregiven time duration is determined by a pregiven number of rotations of the engine.

4. The arrangement of claim 1, wherein said current carburetor setting signal is a mean value (MW) formed over a number (m) of the last sequential ignition time points.

5. The arrangement of claim 4, wherein said number (m) is variable.

6. An arrangement for assisting an operator to adjust a carburetor of an internal combustion engine such as a two-stroke engine, the arrangement comprising:

means for generating a current carburetor setting signal proportional to the carburetor setting;

display means switchable into three operating states which are displayed as an aid to the operator for setting the carburetor;

a control unit for receiving said current carburetor setting signal and including comparator means for comparing said current carburetor setting signal to minimum and maximum desired limit values and providing first, second and third results indicative of whether said current carburetor setting signal is less than said minimum desired limit value, between said desired limit values and greater than said maximum desired limit value, respectively;

drive means for switching said display means into one of said operating states in dependence upon which one of said results is produced by said comparator means;

said current carburetor setting signal being a mean value (MW) formed over a number (m) of the last sequential ignition time points; and, said number (m) being increased in a stepwise manner by multiplying said number (m) by a progression factor (k).

7. The arrangement of claim 6, wherein said first operating state is characterized by said display means is switched off; said second operating state being characterized by said display means being switched on; and, said third operating state is characterized by said display means being intermittently switched on and off; and, said number (m) being increased after each given number of revolutions of the engine during said second operating state of said display means.

8. An arrangement for assisting an operator to adjust a carburetor of an internal combustion engine such as a two-stroke engine, the arrangement comprising:

means for generating a current carburetor setting signal proportional to the carburetor setting;

display means switchable into three operating states which are displayed as an aid to the operator for setting the carburetor;

a control unit for receiving said current carburetor setting signal and including comparator means for comparing said current carburetor setting signal to minimum and maximum desired limit values and providing first, second and third results indicative of whether said current carburetor setting signal is less than said minimum desired limit value, between said desired limit values and greater than said maximum desired limit value, respectively;

drive means for switching said display means into one of said operating states in dependence upon which one of said results is produced by said comparator means; and, said current carburetor setting signal being an rpm-deviation (I) summed up over a pregiven number of revolutions with the discrete rpm-deviation being determined for each revolution.

9. The arrangement of claim 8, wherein the discrete rpm-deviations of sequential revolutions having the correct sign are summed up.

* * * * *